United States Patent

[11] 3,619,366

[72] Inventors Walston Chubb
 Worthington;
 Donald L. Keller, Columbus; Richard A. Wullaert, Columbus; Victor W. Storhok, Columbus, all of Ohio
[21] Appl. No. 822,211
[22] Filed May 6, 1969
[45] Patented Nov. 9, 1971
[73] Assignee The United States of America as represented by the United States Atomic Energy Commission

[54] FUEL SUBASSEMBLY FOR A NUCLEAR REACTOR
 1 Claim, 3 Drawing Figs.
[52] U.S. Cl. ..................................... 176/68, 176/73, 176/79, 176/90
[51] Int. Cl. ..................................... G21c 3/18
[50] Field of Search........................... 176/68, 79, 73, 74, 81, 87, 78, 90

[56] References Cited
UNITED STATES PATENTS

| 3,031,388 | 8/1962 | Barchet | 176/73 |
| 3,114,693 | 12/1963 | Furgerson | 176/73 X |
| 3,157,580 | 11/1964 | Williams | 176/68 |
| 3,184,392 | 5/1965 | Blake | 176/79 X |
| 3,274,067 | 9/1966 | Greebler et al. | 176/68 |
| 3,285,825 | 11/1966 | Jens | 176/68 |
| 3,291,698 | 12/1966 | Fortescue | 176/68 |
| 3,406,094 | 10/1968 | Beisswenger et al. | 176/79 |
| 3,460,236 | 8/1969 | Shoudy | 176/68 |

Primary Examiner—Carl D. Quarforth
Assistant Examiner—Gary G. Solyst
Attorney—Roland A. Anderson ABSTRACT: A fuel subassembly for a nuclear reactor incorporating a body of uranium dioxide or mixed uranium-plutonium dioxide fuel within an elongated casing. A gas plenum is located at the top and bottom of the subassembly and a metal tube or rod serving as a heat sink extends along the axis of the subassembly.

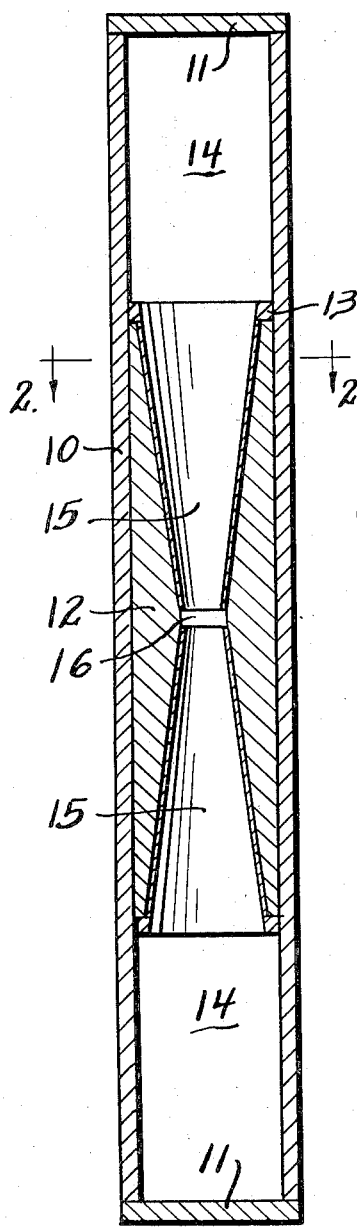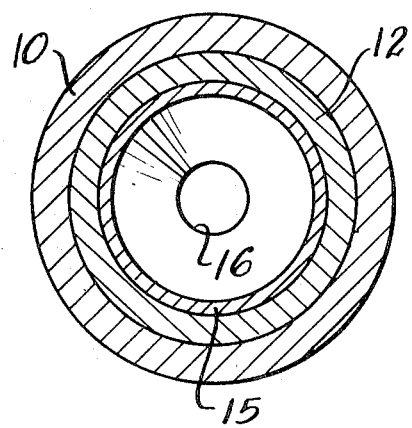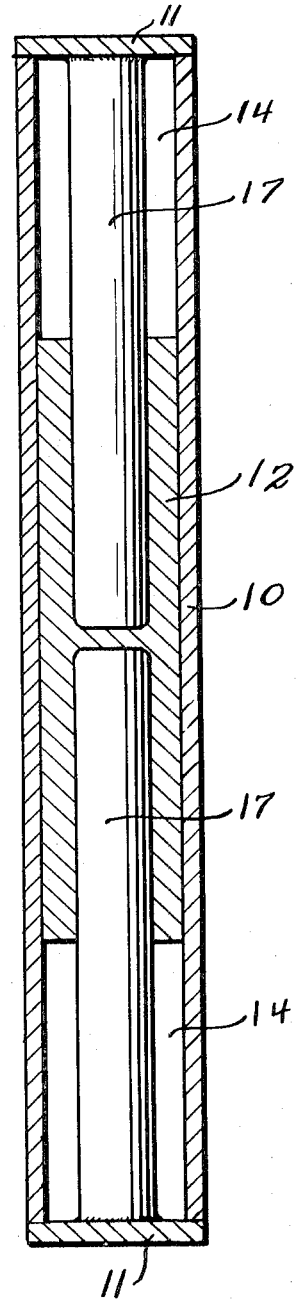

3,619,366

FUEL SUBASSEMBLY FOR A NUCLEAR REACTOR

CONTRACTUAL ORIGIN OF THE INVENTION

The invention described herein was made in the course of, or under, a contract with the United States Atomic Energy Commission.

BACKGROUND OF THE INVENTION

This invention relates to a fuel assembly for a nuclear reactor. In more detail, the invention relates to a dimensionally stable fuel subassembly for use in a fast breeder nuclear reactor. In still more detail, the invention relates to a nonswelling fuel subassembly incorporating uranium dioxide or mixed uranium and plutonium dioxides.

One of the major problems confronting the atomic energy industry is the development of fuel which can be used for a long period of time at a high temperature in a fast breeder nuclear reactor. It is not possible to get the desired performance out of known fuels due to swelling of the fuel. Evidence is readily available which shows that at relatively low temperatures, nuclear fuels grow at a rate of about 0.5 v/o per $10^{20}$ fissions per cm.$^3$. This growth is attributed to the appearance of two fission products in the lattice of the solid fuel for each fission event. At somewhat higher temperatures—about 1100° C. for uranium dioxide—nuclear fuels begin to swell more than the above amount. This swelling is attributed to the precipitation of the fission-product gases as tiny bubbles in the fuel. These bubbles are initially formed at high pressures and they swell as a function of the temperature and the strength of the fuel. At still higher temperatures, gas mobility increases sufficiently that after a large amount of swelling has occurred, gas generation is balanced by gas release and swelling slows or ceases. Various approaches have been tried in an attempt to find a solution to this problem including providing a plenum chamber for fission gases at one or both ends of the fuel subassembly, providing porosity in the fuel, employing cladding which is strong enough to withstand the swelling, venting the gases to the exterior of the subassembly, or changing the fuel material so that swelling does not occur. None of these possible solutions to the problem have been completely satisfactory.

It is accordingly the object of the present invention to develop a fuel subassembly for a fast breeder nuclear reactor which is dimensionally stable when operated at the temperature and the burnup of interest in the fast breeder reactor program.

SUMMARY OF THE INVENTION

This and other objects are attained in a fuel subassembly for a nuclear reactor incorporating a body of uranium dioxide or mixed uranium-plutonium dioxide fuel within an elongated casing. A gas plenum is located at the top and bottom of the subassembly and tubes or rods of a high-melting metal serving as a heat sink are disposed in the fuel along the axis of the subassembly.

BRIEF DESCRIPTION OF THE DRAWING

FIG. 1 is a diagrammatic vertical section of a fuel subassembly constructed in accordance with the present invention, FIG. 2 is a horizontal section thereof taken on the line 2—2 in FIG. 1, and FIG. 3 is a diagrammatic vertical section of a different embodiment of the invention.

DESCRIPTION OF ONE EMBODIMENT OF THE INVENTION

While the fuel subassembly to be described could obviously be used in any reactor employing a liquid coolant, it is designed for use in a liquid-metal-cooled fast-breeder nuclear reactor where the major portion of the fuel is at temperatures above 1500° C. As shown in FIGS. 1 and 2, a fuel assembly constructed in accordance with the present invention comprises an elongated casing or shroud 10, closed at both ends by end caps 11, which encloses a body 12 of uranium dioxide or mixed uranium dioxide-plutonium dioxide fuel. Tantalum plates 13 extend across the subassembly near the ends thereof to define fission-gas plenums 14 at both ends of the subassembly. Penetrating each of these plates 13 is a tapering tantalum vent tube 15 which is located on the axis of the subassembly and terminates just short of the center of the fuel body 12. An orifice 16 at the end of each vent tube 15 provides a passage for the escape of fission gases from the center of the fuel body to vent tube 15.

As shown in FIG. 3, the fuel subassembly may include an elongated casing 10, closed at both ends by end caps 11, which encloses a body 12 of fuel. According to this embodiment of the invention, pins 17 of a tungsten-rhenium alloy are fastened to the end caps 11 and extend into the center of the fuel body 12 along the centerline thereof.

The fuel subassembly described was designed in an attempt to improve venting of fission gases from the hot spot at the center of the fuel. As will become apparent hereinafter, the observed result was not the result expected.

A capsule containing six specimens, four of uranium dioxide and two of a copper-uranium carbide cermet, was irradiated for 3000 hours at temperatures up to 1750° C. and burnups to $2.0 \times 10^{20}$ fissions per cubic centimeter. The two cermet specimens will not be mentioned again, since irradiation results obtained thereon are not pertinent to the present invention. The capsules containing uranium dioxide specimens were 1.65 inches in length and 0.25 inch in diameter. The uranium dioxide specimens therein were 0.86 or 0.88 inch in length and 0.20 inch in diameter and had a density of 97 percent of theoretical. Two of these specimens included a 110-mil-diameter centerline hole, while the other two included vent tubes extending into the center of the fuel body disposed along the axis of the subassembly. These vent tubes tapered from a diameter of 55 mils at the center to a diameter of 165 mils at the ends of the uranium dioxide specimens. One of these specimens had an orifice drilled through the ends of the vent tubes at the center of the fuel body; the other did not.

Even though the vent tube in specimen 307 did not include an orifice at the center of the fuel body when installed in the specimen, orifices were discovered therein after the specimen had been subjected to radiation. It is therefore assumed that this orifice formed shortly after irradiation started so that fission gases could vent through this orifice to the plenum.

The following table summarizes the specimen arrangement, irradiation conditions and dimensional changes for the uranium dioxide specimens.

It is at once apparent that the axial holes at the center of the specimens were not sufficient to prevent swelling and that the specimens containing the axial metal tube swelled only about half as much as did the specimens containing axial holes. Thus provision of a vent at the center of the fuel body is not alone sufficient to prevent swelling.

Metallographic sections were taken from each specimen. A transverse section was taken at the longitudinal midplane of specimens 304 and longitudinal sections were taken of specimens 305, 306 and 307. A typical metallographic cross section of a hollow uranium dioxide specimen (304) reveals a grain structure which is mainly columnar in nature and shows a considerable number of lenticular voids, especially near the centerline hole. A longitudinal section of duplicate specimen 305 was similar in appearance. Swelling data for these specimens indicate a high initial swelling rate which diminished in the later stages of the irradiation. These high initial swelling rates suggest significant initial gas retention and bubble formation in uranium dioxide at 1700° C. However, quantitative metallographic data indicate that the central portion of the uranium dioxide contains only about 8 volume percent porosity. This is far below the external 20 volume percent swelling exhibited by the specimen. Also, since the specimen originally contained about 6 volume percent porosity, it is apparent that the greater portion of fission-gas bubbles which caused swelling were swept out and the porosity transferred to the center hole at some time during the irradiation. Thus, while the center hole reduced the total swelling during the irradiation, it did not prevent a substantial amount of swelling from occurring near the beginning of the irradiation.

pins are mounted on the end caps so that two such pins extend to the center of the fuel subassembly along the axis of the fuel body from opposite end caps. For example, in fuel specimens of the size heretofore specified, these pins can be 110 mils in

| Specimen (in order from top of capsule) | Composition | Specimen geometry | BRR cycle | Surface temp.[a], °C. | Estimated accumulated burnup, $10^{20}$ fissions/cm.[3] | Dimensional changes,[b] percent | | | |
|---|---|---|---|---|---|---|---|---|---|
| | | | | | | Maximum cladding OD | Average fuel OD | Fuel length | Average fuel volume |
| 304 | $UO_2$ (20% enriched; 94% dense). | 110-mil centerline hole | 1 | 1,750 | 0.30 | 2.7 | 2.6 | 3.8 | 9.0 |
| | | | 2 | 1,700 | 0.58 | 4.1 | 3.4 | 5.4 | 12.2 |
| | | | 3 | 1,680 | 0.86 | 5.9 | 4.3 | 4.9 | 13.5 |
| | | | 4 | 1,575 | 1.12 | 9.3 | 7.4 | 3.8 | 18.6 |
| | | | 5 | 1,450 | 1.43 | 9.2 | 8.5 | 3.7 | 20.7 |
| | | | 6 | 1,470 | 1.69 | 10.5 | 9.6 | 4.1 | 23.3 |
| | | | 7 | 1,440 | 1.88 | 7.8 | 6.8 | 4.0 | 17.6 |
| | | | | | | [9.0] | [7.8] | | [19.6] |
| 305 | $UO_2$ (20% enriched; 94% dense). | 110-mil centerline hole | 1 | 1,735 | 0.31 | 3.4 | 2.1 | 4.5 | 8.7 |
| | | | 2 | 1,680 | 0.60 | 4.0 | 4.1 | 4.9 | 13.1 |
| | | | 3 | 1,645 | 0.89 | 5.8 | 5.6 | 4.4 | 15.6 |
| | | | 4 | 1,580 | 1.16 | 7.2 | 5.4 | 4.4 | 15.2 |
| | | | 5 | 1,470 | 1.48 | 5.9 | 5.2 | 4.1 | 14.5 |
| | | | 6 | 1,495 | 1.74 | 8.7 | 7.7 | 4.6 | 20.0 |
| | | | 7 | 1,460 | 1.95 | 6.2 | 4.4 | 4.7 | 13.5 |
| | | | | | | [6.3] | [5.4] | | [15.3] |
| 306 | $UO_2$ (20% enriched; 97% dense). | Vented | 1 | 1,710 | 0.31 | 1.3 | 0.8 | −1.0 | −0.2 |
| | | | 2 | 1,665 | 0.60 | 2.0 | 1.1 | −0.4 | 1.8 |
| | | | 3 | 1,610 | 0.89 | 1.6 | 1.4 | 0.2 | 3.0 |
| | | | 4 | 1,570 | 1.16 | 2.6 | 2.4 | 2.0 | 6.8 |
| | | | 5 | 1,475 | 1.48 | 3.9 | 2.5 | −0.4 | 5.4 |
| | | | 6 | 1,495 | 1.75 | 3.0 | 2.6 | −0.1 | 5.1 |
| | | | 7 | 1,480 | 1.95 | 2.1 | 1.7 | 0.3 | 3.7 |
| | | | | | | [2.2] | [1.0] | | [2.3] |
| 307 | $UO_2$ (20% enriched; 97% dense). | Closed vents | 1 | 1,730 | 0.32 | 1.3 | 0.9 | 2.7 | 4.5 |
| | | | 2 | 1,670 | 0.62 | 3.5 | 1.7 | 2.1 | 5.5 |
| | | | 3 | 1,650 | 0.92 | 3.9 | 1.8 | 2.2 | 5.8 |
| | | | 4 | 1,605 | 1.19 | 3.5 | 2.7 | 1.5 | 6.9 |
| | | | 5 | 1,540 | 1.57 | 5.1 | 5.4 | 2.8 | 13.8 |
| | | | 6 | 1,550 | 1.78 | 5.4 | 5.3 | 1.6 | 12.3 |
| | | | 7 | 1,565 | 1.98 | 7.2 | 4.2 | 2.1 | 10.6 |
| | | | | | | [5.9] | [5.1] | | [10.3] |

[a] Temperatures measured at the midpoint of the length of the fuel and averaged over each cycle.
[b] Values in brackets are based on micrometer measurements of diameter; all other measurements taken from neutron radiographs.

As will be evident from the table, the vent-type specimens swelled at a lower rate than did the above-mentioned uranium dioxide specimens with axial centerline holes. A longitudinal metallographic section thereof shows channels around the tantalum vent tube which suggests that fission gases migrated to an annular region between the vent tube and the casing before they were released to the plenums. Apparently the presence of the vent tube has drastically changed the thermal profile of the fuel and moved the thermal center, the position of zero thermal gradient, to the position of this annular channel. While the grain structure is similar to that observed in specimens 304 and 305, there are few, if any, lenticular voids apparent in specimen 306.

A striking difference is seen in the appearance of a longitudinal section of specimen 307; however, slightly different conditions of irradiation are probably responsible for most of these differences. The reason for other differences cannot at this time be given. It is notable, however, as shown in the table, that specimens 306 and 307 containing vent tubes swelled only about one-half as much as specimens 304 and 305 containing an axial hole. While it is difficult to explain in detail the differences in behavior of these specimens, it is believed that, while the manner of migration of gases is similar, the timing and rate of gas release is different. It seems likely that the vent tube acted more as a heat sink than as a pressure relief tube, and that the consequent change in thermal profile caused an increased gas relief rate by an increased ratio of surface to volume and shortened paths of bubble migration. Also it is conceivable that reaction of the uranium dioxide with tantalum could be affecting the gas release characteristics of uranium dioxide by lowering the oxygen to uranium ratio in the fuel. This should increase the total vapor pressure of the fuel and encourage gas-bubble movement.

Since it is apparent that the vent tube acted more as a heat sink than as a pressure relief tube, the same result can be attained by substituting an axial metal pin for the vent tube. According to the embodiment of the invention shown in FIG. 3, diameter and be formed of tungsten-rhenium alloy. The fuel will again form layers adhering to this pin and to the casing, leaving an annular void therebetween extending the length of the specimen. Fission gases will escape from the surfaces of the fuel exposed to this annular void and will vent to the plenums through these annular voids. In such an arrangement it is at once apparent that the distance the fission gases must travel to reach the void is relatively small and the surface over which the fission gases can escape is relatively great.

In addition to tantalum, the axial pin or tube may be formed of any metal melting sufficiently high which is economically practical. Obvious possibilities are tungsten, molybdenum and rhenium. Alloys of these metals may also, of course, be employed.

The fuel density is not in any way critical. In fact, the density of the fuel may be anywhere from 40 or 50 percent of theoretical to near theoretical density. At the temperature of operation contemplated, the fuel will sinter to near theoretical density no matter what the starting density.

The invention applies only to fuel subassemblies in which uranium oxide, or mixed uranium-plutonium oxides, is the fuel, since other possible fuels such as uranium carbide or uranium nitride have different physical properties from uranium dioxide.

It will be understood that the invention is not to be limited to the details given herein but that it may be modified within the scope of the appended claims.

The embodiments of the invention in which an exclusive property or privilege is claimed are defined as follows:

1. In a fuel subassembly for a nuclear reactor comprising a body or uranium dioxide or mixed uranium-plutonium dioxide fuel within an elongated casing having a plenum for fission gases at both ends thereof, the improvement comprising a tapering tantalum tube extending into the center of the fuel body from each end thereof along the axial center line of the assembly.

* * * * *